United States Patent [19]

Nixon

[11] 4,340,334
[45] Jul. 20, 1982

[54] TURBODRILL WITH RUBBER ROTOR BEARINGS

[75] Inventor: Jeddy D. Nixon, Houston, Tex.

[73] Assignee: Maurer Engineering, Inc., Houston, Tex.

[21] Appl. No.: 116,913

[22] Filed: Jan. 30, 1980

[51] Int. Cl.³ .............................................. F01D 25/16
[52] U.S. Cl. ............................. 415/172 A; 415/173 R; 415/199.5; 415/501
[58] Field of Search .................. 175/107; 415/172 A, 415/173 R, 173 A, 199.5, 502

[56] References Cited

U.S. PATENT DOCUMENTS

| 2,348,047 | 5/1944 | Yost | 175/107 X |
| 3,267,869 | 8/1966 | Vartapetov | 415/199.5 X |
| 3,971,450 | 7/1976 | Fox | 175/107 |

FOREIGN PATENT DOCUMENTS 814956 6/1959 United Kingdom ................ 175/107

Primary Examiner—Leonard E. Smith
Attorney, Agent, or Firm—Neal J. Mosely

[57] ABSTRACT

A turbodrill which is connected to a string of drill pipe as a rotating shaft for driving a drill bit which may be a rotary bit or a high speed solid head diamond bit. The turbine section has rotor and stator blades which are cresent shaped in cross section with each blade having an exit angle of 14°-23° for maximum turbine efficiency. The bearing shaft is provided with chevron rotary seals positioned below the rotary bearings carrying both radial and vertical thrust. Fluid lubricant fills the space from the rotary seals to a predetermined level above the bearings. A piston seals the lubricant chamber and is pressurized by drilling fluid (i.e. mud) flowing through the tool. A layer of lubricant fluid overlies the first piston and has a second piston covering said fluid and transmitting pressure from the drilling fluid to the lubricant fluid surrounding the bearings. Rubber friction bearings which are cooled and lubricated by flow of drilling mud are provided between the rotor and stator bearing surfaces which provide for extended rotor bearing life and cushion the radial thrust bearings against radial shock and provide for a substantially extended life for the radial thrust bearings.

6 Claims, 11 Drawing Figures

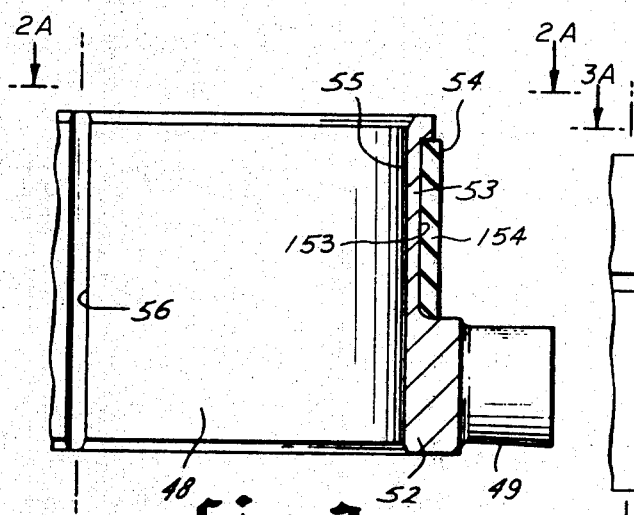
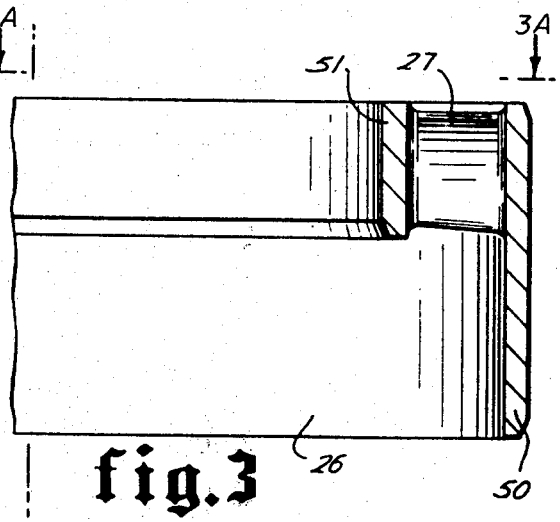
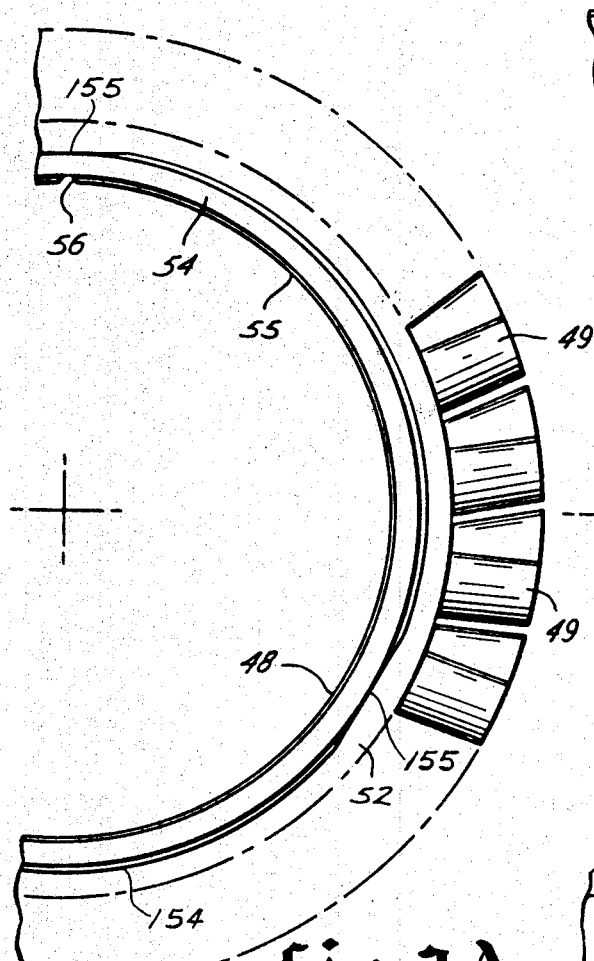
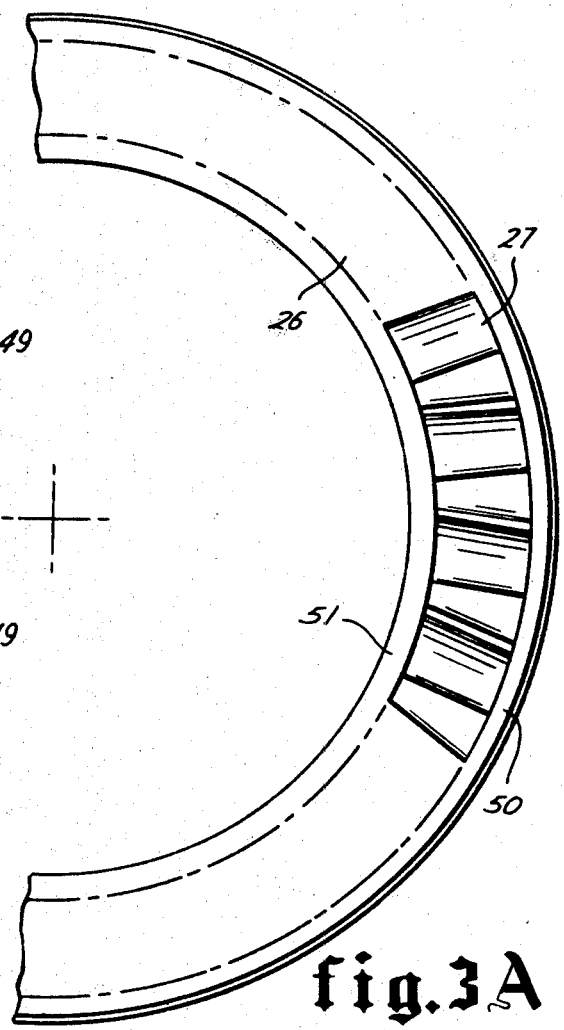

TURBODRILL WITH RUBBER ROTOR BEARINGS

BACKGROUND OF THE INVENTION

1. Field of the Invention

This invention relates to turbodrills and to certain improved features therein.

Down hole drilling motors were first invented 100 years ago. Down hole drilling motors were first extensively tested in the 1920's. They did not find wide spread use until the 1950's when turbodrills began to be used in the Soviet Union. By the early 1960's, it is estimated that 85% of the wells in the Soviet Union were being drilled with turbodrills. Down hole drilling motors have found wide spread use in the United States for drilling directional holes, but they are not widely used for straight hole drilling because of bearing and seal problems. Commercial down hole drilling motors operate at speeds ranging from 300 to 1,000 rpm whereas roller bits operate most effectively at speeds of 50 to 150 rpm. At high motor speeds, roller bearings fail after periods of about 5 to 15 hours whereas with conventional drilling equipment operating at lower speeds the bearings of roller bits last up to 200 hours. Down hole motors have had substantial problems in design of radial and vertical thrust bearings, lubrication systems, turbine efficiency, housing construction, etc., which have limited substantially the acceptability of down hole motors in petroleum drilling and in other applications. There has been a need for a bearing design in turbodrills that will give extended life to the bearings and reduce the need for frequent replacement.

2. Brief Description of the Prior Art

Down hole drilling motors were patented soon after the advent of rotary drilling rigs in the 1860's. Cross U.S. Pat. No. 174,922 discloses a very primitive turbodrill. Baker U.S. Pat. No. 292,888 discloses a single stage axial flow turbodrill which is similar in some respects to modern turbodrills. Scharpenberg U.S. Pat. No. 1,482,702 discloses one of the earliest multi-stage turbodrills which was the forerunner of turbodrills currently in use. The Scharpenberg turbodrill contained a lubrication system which allowed the thrust bearing to operate in oil or grease. Drilling fluid acting on a floating piston pressurized the lubricant in the system. The bearings in modern turbodrills operate directly in the abrasive drilling mud, resulting in rapid failures, which limit the application of these drills.

Capeliuschnicoff U.S. Pat. No. 1,681,094 discloses a single staged geared turbodrill. These turbodrills were tested extensively in the Soviet Union from 1924 to 1934. The Russians had severe problems with the speed reducers Capeliuschnicoff turbodrill and subsequently changed to the Scharpenberg turbodrill. Several Russian engineers perfected multistage turbodrills during the 1940's and 1950's and by the early 1960's, the Russians were drilling 80 to 90% of their wells with axial flow turbodrills. The Russians licensed turbodrill technology to companies in the United States, France, Germany and Austria. Turbodrills have had a rather limited commercial acceptance and are used primarily in directional wells. Virtually all down hole drilling motors have four basic components;
 1. Motor section
 2. Vertical thrust bearings
 3. Radial bearings
 4. Rotary seal The bearings and seals can be placed in a separate package or unit at the motor section and thus can be used on any type of motor (i.e. turbodrills, positive displacement motors, etc.).

There are two basic types of down hole drilling motors:
 1. Turbodrills
 2. Positive displacement Turbodrills utilize the momentum change of drilling fluid (i.e. mud) passing through the curved turbine blades to provide torque to turn the bit. Diamond bits are used on most turbodrills because these motors turn at speeds of 600 to 1,000 rpm whereas roller-type rock bits operate effectively only at speeds up to about 150 rpm. Positive displacement motors have fixed volumetric displacement and their speed is directly proportional to the flow rate. There are three basic types of positive displacement motors in use or currently under development:
 1. Moineau motor
 2. Flexing vane motor
 3. Sliding vane motor These motors have large volumetric displacement and therefore deliver higher torques at lower speeds.

Thrust bearing failures in down hole motors is a problem because of high dynamic loads produced by the action of the bits and by drill string vibrations. One major oil company placed a recorder at the hole bottom and found that dynamic loads were often 50% higher than the applied bit It was found on occasion that the bit bounced off bottom and produced loads in excess of 120,000 pounds when drilling at an applied bit weight of 40,000 pounds. These high loads can cause rapid failure of the thrust bearings; consequently these bearings must be greatly over designed to operate in the hostile down hole environment.

Two types of bearings have been used in down hole drilling motors:
 1. Rubber friction bearings
 2. Ball or roller bearings In existing motors, these bearings operate directly in the abrasive drilling mud and usually wear out in 20 to 100 hours. In addition, the rubber friction bearings have high friction and therefore absorb 30 to 40% of the output torque of the turbodrills. The lift of the vertical thrust bearings can be increased by operating at bit weights which nearly balance the hydraulic down thrust thereby removing most of the load from these bearings.

Radial bearings are required on each side of drilling motors and on each side of the vertical thrust bearings. These radial bearings are usually subjected to lower loads than the thrust bearings and therefore have much longer life. Two basic types of radial bearings are used in down hole motors:
 1. Marine bearings
 2. Roller or ball bearings Most motors contain marine bearings made of brass, rubber or similar bearing materials. The marine bearings are cooled by circulated mud through them.

Rotary seals are currently the weakest link in down hole motor design. Improved seals would allow the bearings to be sealed in lubricant, thereby increasing their life substantially. Improved seals would allow bits to be operated at higher pressures thereby greatly increasing drilling rate.

There are six basic types of seals that have been tested in down hole motors:

1. Packing seals
2. Face seals
3. Labyrinth seals
4. Radial lip seals
5. Constrictions (friction bearings and marine bearings)
6. Flow metering seals Existing drilling motors allow drilling mud to continuously leak through the rotary seals by constricting the flow with any of a variety of seals permitting leakage. Sand and other abrasive particles are filtered out of the mud in the rotary seals which results in rapid failure of the seals. Any substantial improvement in turbodrill design will require positive seals which allow no appreciable leakage.

Recently issued U.S. Pat. Nos. 4,114,702; 4,114,703; and 4,114,704 provide design features that overcome many of the above noted problems but could be further improved by suitable means extending bearing life.

SUMMARY OF THE INVENTION

The down hole well drilling tool has housing which is adapted to be connected to a drill string and supports a rotary shaft which extends downward for supporting a drill bit. The housing includes a turbine motor to rotate the shaft. Upper and lower thrust bearings positioned around the shaft within the housing to support the shaft against vertically acting forces. The upper thrust bearing is positioned to support the shaft against upward thrust during normal drilling operation. The lower thrust bearing supports the shaft when the housing is lifted out of drilling operation. The turbine motor includes a stator and a rotor rotatable thereon having a rubber bearing in the friction bearing surfaces thereof that provides for cooling and lubrication of the bearing surfaces by flow of drilling mud and that protects the radial thrust bearings against early failure.

BRIEF DESCRIPTION OF THE DRAWINGS

FIG. 2 is an enlarged view, in vertical section, of the one of the turbine rotor rings, showing a rubber friction bearing in section and showing the turbine blade in elevation;

FIG. 2A is a plan view of the turbine rotor, viewed from the line 2A—2A;

FIG. 3 is an enlarged view, in vertical section, illustrating one of the turbine stator rings, used with the rotor ring of FIG. 2.

FIG. 3A is a plan view, seen from the line 3A—3A, of the stator ring shown in FIG. 3;

DESCRIPTION OF THE PREFERRED EMBODIMENT

This invention discloses, in part, features shown in U.S. Pat. Nos. 4,225,000; 4,246,976 4,114,702; 4,114,703; and 4,114,704 and illustrates certain improvements therein that provide for extended bearing life of the radial thrust bearings.

Figure 1A:
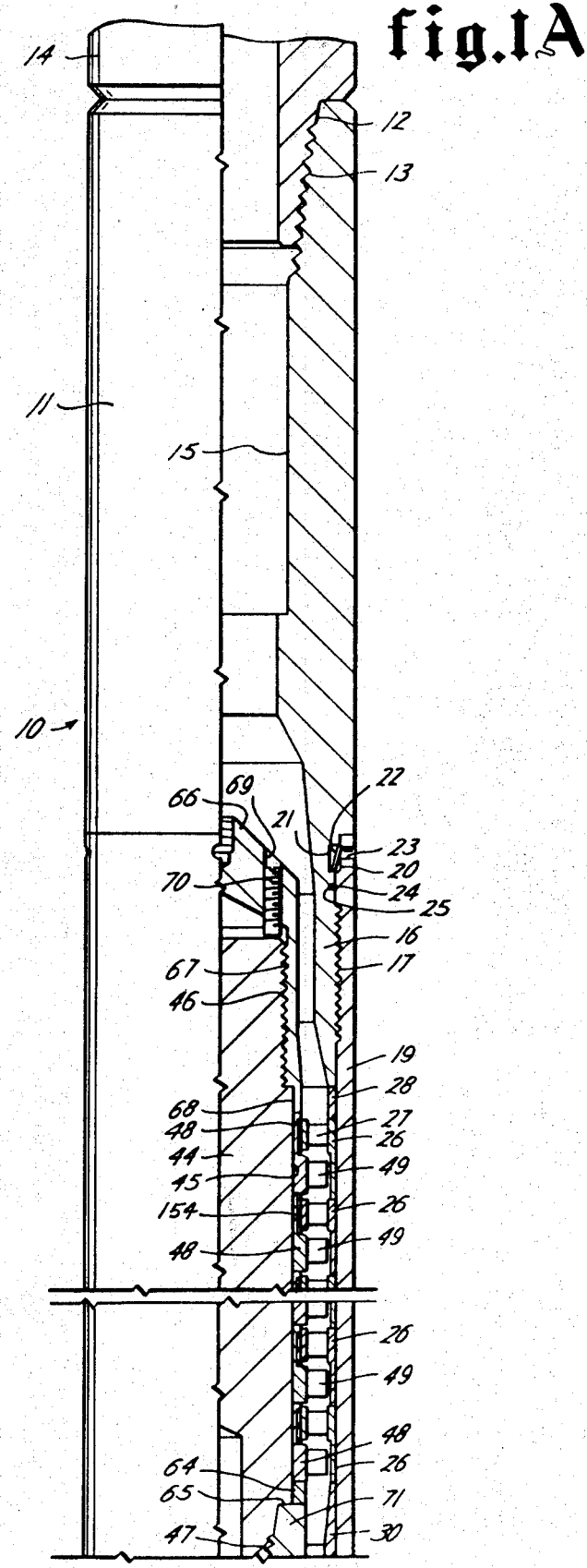
FIG. 1A is a view of the uppermost portion of a turbodrill, partly in elevation and partly in vertical section and further broken vertically to reduce the length of the turbine section.
Figure 2B:
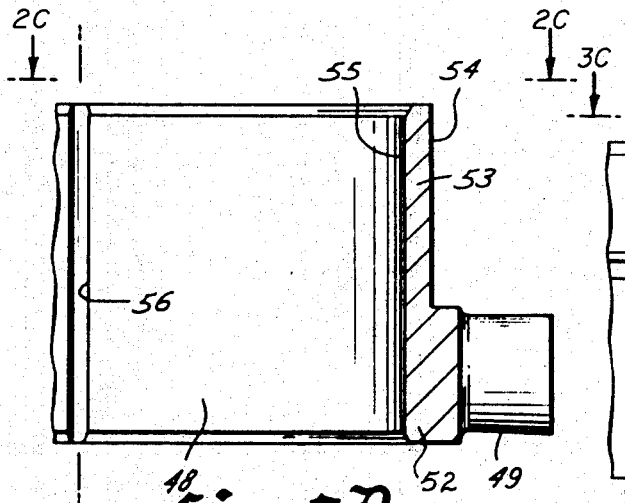
FIG. 2B is an enlarged view, in vertical section, of another embodiment of the rotor ring which does not include the rubber friction bearing thereon.
Figure 3B:
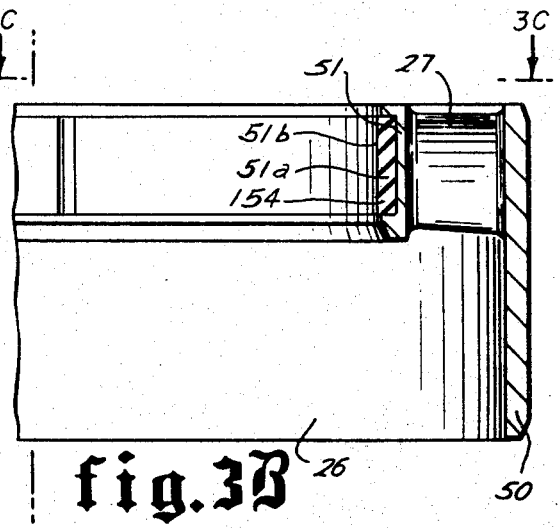
FIG. 3B is an enlarged view, in vertical section, illustrating a stator ring, having a rubber friction bearing therein, to be used with the rotor shown in FIG. 2B.
Figure 2C:
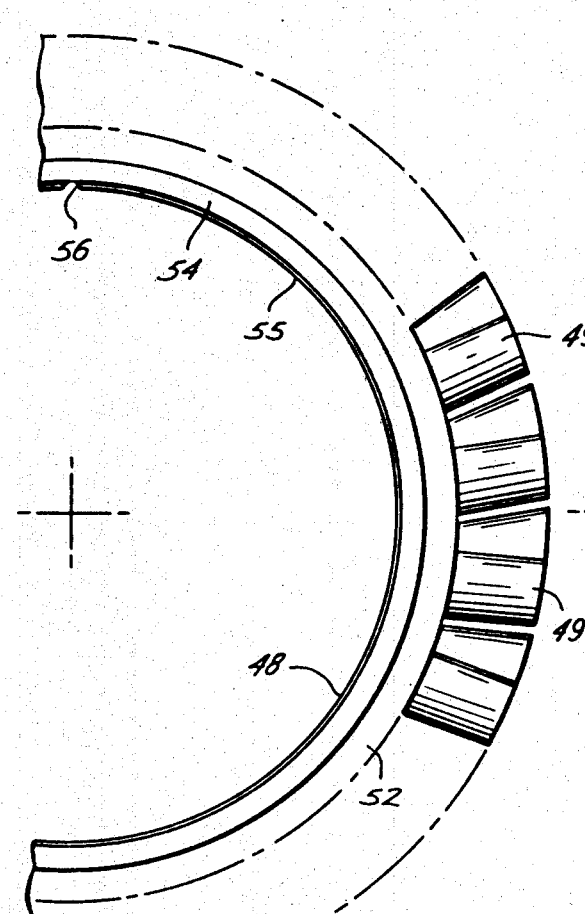
FIG. 2C is a plan view of the turbine rotor of FIG. 2B viewed from the line 2C—2C.
Figure 3C:
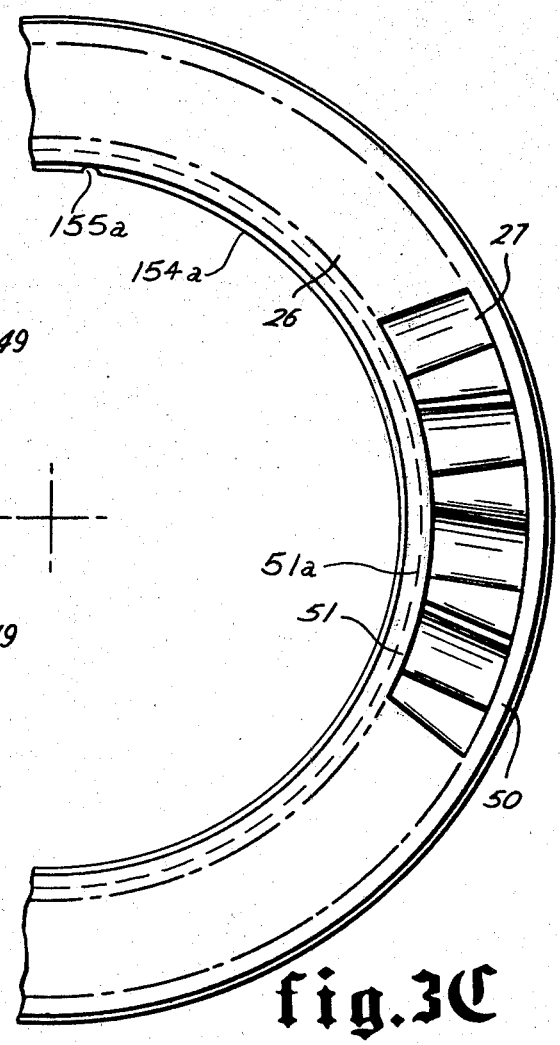
FIG. 3C is a plan view, seen from the line 3C—3C, of the stator ring shown in FIG. 3B.

Referring to the drawings by numerals of reference and more particularly to FIG. 1A, inclusive, there is shown a turbodrill which is generally designated 10. Turbodrill 10 is very long in relation to its width. The section below the lower end of FIG. 1A is as shown in FIGS. 1B, 1C and 1D of U.S. Pat. Nos. 4,225,000; 4,246,976; 4,114,702; 4,114,703; and 4,114,703, referred to above. A typical turbodrill of this design which is 7¾ inches in diameter is about 20.5 feet long. The turbine section represents almost half of the length of the turbodrill and it is therefore necessary to omit a large portion of the multi-stage turbine.

At the upper end of turbodrill 10 there is provided a stator housing sub 11 having a threaded box end portion 12 forming a threaded connection 13 with the lower end of a drill string 14. Stator housing sub 11 has an internal longitudinal passage 15 communicating with the open end of drill string 14.

Stator housing sub 11 has a threaded pin portion 16 which is threadedly connected as at 17 in the box end portion 18 of the stator housing 19. Stator housing box portion 18 has an internal annular groove 20 therein which mates, when assembled, with an annular groove 21 in the pin portion 16 of stator housing sub 11. A lock ring 22 extends peripherally around the turbodrill in the annular space provided by matching grooves 20 and 21 and abuts the walls of said grooves to prevent disassembly of said stator housing from said stator housing sub accidentally. Stator housing box portion 18 is also provided with a plurality of holes 23 uniformly spaced to provide points for application of pressure to lock ring 22 to permit separation of stator housing 19 from stator housing sub 11. Details of this feature of construction are shown in FIGS. 6 and 7, of U.S. Pat. No. 4,114,704. Threaded connection 17 is sealed against leakage by "O" ring 24 positioned in groove 25.

The turbine section of the turbodrill is positioned in the stator housing 19 just below the threaded joint 17 connecting to the stator housing sub 11. The stator portion of the turbine consists of a plurality of stator members 26 which are shown in more detail in FIGS. 3, 3A, 4 and 5. The stator members 26 are annular in shape and provided with vanes or blades 27 which will be described more fully in connection with the detailed drawings of these parts. Stator members 26 have an exterior surface providing a sliding fit in the inner surface of stator housing 19. Stator members 26 are positioned as a stack of abutting members extending longitudinally within the stator housing 19.

In a typical turbodrill having a 7¾ inch diameter, there are fifty of the stator members and fifty of the matching rotor members. The stator members are preferably made of a hard beryllium copper alloy which is wear-resistant and which has a slightly higher coefficient of expansion than the steel of stator housing 19. The stack of stator members 26 is maintained under compression in the stator housing 19 with the result that the members are expanded to fit tightly against the inner surface of stator housing 19 and resist slippage therein. Also, because of the higher thermal coefficient of expansion, the stator members 26 tend to expand more at the high temperatures encountered in use of the turbodrill with the result that the increase in temperature encountered during operation causes stator members 26 to fit more tightly within stator housing 19 and effectively prevents slippage therein.

At the upper end of stator housing 19, there is positioned an annular stator spacer 28 which positions the upper most stator member 26 relative to the end of stator housing sub 11. At the lower end of stator housing 19 there is a box portion 29 which is internally threaded and receives tubular stator makeup sleeve 30 in a threaded joint 31. The lower end of sleeve 30 is threadedly supported in housing 19. When stator makeup sleeve 30 is tightened to the position shown, the upper end thereof abuts the lowermost stator member 26 and compresses the entire stack of stator members against each other and against annular stator spacer member 28.

Stator makeup sleeve 30 when fully tightened maintains the stack of stator members 26 under sufficient compression to press them tightly against the inner surface of stator housing 19 and prevents slippage of the stator members during operation as described above.

At the upper end of the turbodrill, inside stator housing 19, there is positioned rotor shaft 44 which has a generally cylindrical exterior surface 45 terminating at the upper end in threaded portion 46 and at the lower end in threaded portion 47. Rotor shaft 44 has a plurality of rotor members 48 stacked thereon in abutting relationship and blades or vanes 49 vertically aligned with the stator vanes 27.

Reference is now made to FIGS. 2, 2A, 3, 3A, 4 and 5, inclusive, which illustrate the construction and relationship of the stator and rotor members in more detail. In FIG. 3, it is seen that stator member 26 comprises an outer sleeve 50 and inner sleeve 51 with vanes or blade members 27 positioned therebetween and uniformly spaced around the periphery thereof. The outer surface of outer sleeve 50 abuts the inner surface of stator housing 19 securely to prevent slippage of the stator member relative to the housing. The inner surface of inner sleeve 51 is a smooth bearing surface in which rotor members 48 are guided for smooth rotary motion.

Rotor members 48 comprise hub portion 52 from which blade or vane members 49 extend and sleeve portion 53. The exterior of sleeve 53 has a peripheral undercut or groove 153 in which there is positioned a rubber bearing member 154. Rubber bearing member 154 is preferable of Buna N having a Durometer hardness of about 90. Rubber bearing member 154 is molded in place and has a plurality of flats or grooves 155 equally spaced around the periphery thereof providing channels or passages for flow of lubricant. The exterior surface 54 of rubber bearing 154 is a smooth bearing surface which fits the inner bearing surface of inner sleeve 51 of stator member 26. The inner surface 55 of sleeve 53 and hub 52 is a smooth surface and is provided with groove or keyway 56 for securing rotor members 48 non-rotatably on rotor shaft 44.

Figure 4:
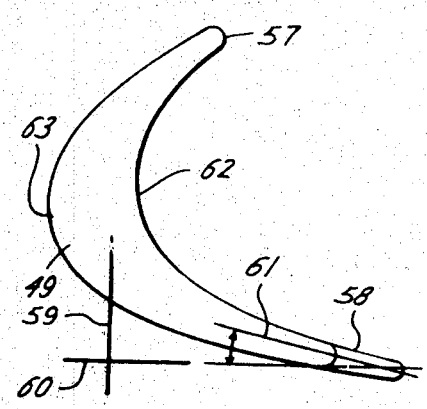
FIG. 4 is a view in end elevation of one of the stator or rotor blades.
Figure 5:
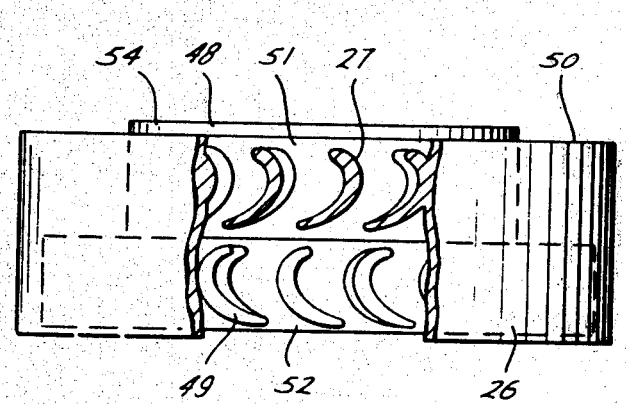
FIG. 5 is a view in elevation, and partially broken section, of a sub-assembly of a turbine stator and rotor.

In FIGS. 4 and 5 there are shown detail end views of the blade or vane members 49 and 27, respectively. The blade or vane members are generally crescent shaped. In FIG. 4 vane or blade member 49 is shown in substantially enlarged detail. Vane member 49 has an upper end 57 which is the inlet end of the vane for receiving fluid (i.e. mud) and the lower end 58 which is the outlet or exit for discharge of fluid from the blade or vane. The shape of the blades or vanes is critical in the design of this turbodrill. In particular, the exit angle of the blade or vane must be in a very narrowly defined range in order to produce a maximum torque in the turbine. In FIG. 4, the line 59 is the center line of the rotor shaft and line 60 is the line normal thereto. The exit angle of the blade or vane 49 is measured as the angle between line 61 and the normal line 60. Line 61 is a tangent to a curve line on the midpoints between the outer curve 62 and outer curve 63 of blade or vane member 49. The angle between line 60 and 61 must lie within a range from 40 degrees to 23 degrees and an angle of 18 degrees–21 degrees is preferred. At this exit angle for the blade or vane member, the maximum rotary thrust or torque is obtained from the turbine. As noted, FIG. 4 is an enlarged detail view of vane or blade member 49 of rotor 48. The sutructure of the vane or blade members 27 of stator 26 is the mirror image of vane or blade members 49 in all details.

Rotor members 48 are positioned on rotor shaft 44 in a stacked relation, as shown in FIG. 1A, with vane or blade members 49 aligned vertically with vane or blade members 27 of stator members 26. Rotor members 48 are positioned on shaft 44 with the keyways 56 thereof aligned and aligned with a longitudinally extending groove in rotor shaft 44. A steel wire (not shown) is inserted in the mating grooves of shaft 44 and rotor members 48 to secure the rotor member non-rotatably thereon. The lower end of the stack of rotor members abuts rotor spacer ring 64 which seats against the upper end 65 of splined connecting member. At the upper end of the rotor shaft 44 there is positioned a cap or makeup screw member 66 which is internally threaded at 67 and forms a tight threaded connection with the threaded end portion 46 of rotor shaft 44. When cap member 66 is tightened in position its lower end portion 68 abuts the upper most rotor member 48 and compresses the stack of rotor members tightly on rotor shaft 44. Cap member 66 is closed at its upper end and has one or more threaded apertures 69 in which there are positioned set screws 70 to secure cap member 66 against loosening during operation.

OPERATION

The turbodrill is assembled as illustrated in FIG. 1A. The housing is in several sections, as described, in U.S. Pat. Nos. 4,225,000; 4,246,976; 4,114,702; 4,114,703; and 4,114,703, and is threadly connected at several points. Since the turbodrill housing is held stationary and the drill is driven at high speed there are substantial torques placed upon the threaded joints which tend to cause those joints to unscrew. In the past, threaded joints have been protected against unscrewing by use of set screws. However, set screws sometimes come loose themselves and the desired protection for the threaded joint may not be obtained. In this construction, the threaded joints are protected by a lock ring arrangement which is shown in use for several threaded connections. In FIGS. 6 and 7 of U.S. Pat. No. 4,114,704, apparatus is shown for releasing the lock ring.

When the turbodrill is connected to drill string 14 as shown in FIG. 1A, drilling mud is pumped through the drill string at a high rate of flow and through the turbo drill. The drilling mud flows through passage 15 into the annular space at the upper end of the turbine section. The drilling mud flows through each of the turbine stages causing the turbine to rotate at a high speed. The drilling mud flows past each of the vanes 27 of the stator members 26 and is directed from those vanes at a high velocity against vanes 49 of rotor members 48. The shape of the vanes of the stator and rotor members has been discussed fully in connection with the description of the assembled apparatus. The shape of the vanes particularly the exit angle, is designed to create a maximum thrust on the rotor members and a maximum torque on the rotor shaft 44 as the drilling mud is pumped through the turbine section. As indicated above, a large number of turbine elements make up the turbine section. In a typical 7¾ inch turbodrill, there are fifty sets of stator members and fifty sets of rotor members, which results in the production of a high torque and a high speed of turning of the rotor shaft 44.

The drilling mud flowing through the turbine section also tends to cool this section, which tends to heat as a result of the high speed of operation. The drilling mud also flows through passages 155 in rubber bearings 154 to cool the friction bearing surfaces where the outer bearing surface 54 of rubber bearings 154 rotate in sleeves 51 of stator members 26. The rubber bearing members 154 thus provide for lubrication and cooling of the friction bearing surfaces in the turbine section. The Buna N rubber bearing members 154 are particularly resistant to wear by the mud and yield a substantially longer bearing life than is obtained with metal to metal bearings in the rotor/stator assembly. The rubber bearing members 154 also function to protect the radial thrust bearings 105, 129 and 136 and extend the service life thereof. Rubber bearing members 154 can be reinstalled easily after they have worn out.

The rotor shaft 44 which is turning at a high rate of speed is connected by a splined connection, as described in U.S. Pat. Nos. 4,225,000; 4,246,976; 4,114,702; 4,114,703; and 4,114,703, to a bearing shaft. The drilling mud flows from the turbine section through the annular space around the splined connection and through the passage in the middle of the splined connection into the hollow passage extending through the bearing shaft to the exterior of the drill where the mud is discharged through the drill bit (whether a rotary bit or a solid head bit) and then flows back up the hole being drill to remove cuttings from the hole all as shown in U.S. Pat. Nos. 4,225,000; 4,246,976; 4,114,702; 4,114,703; and 4,114,703.

AN ALTERNATE EMBODIMENT

In FIGS. 2B, 2C, 3B and 3C there is shown an alternate embodiment of the invention in which the rubber bearing members are positioned in the stator members instead of the rotor members. In this embodiment, the exterior surface of rotor sleeve 54a is a smooth bearing surface. The inner sleeve 51 of stator member 26 has an inner undercut or groove 51a and rubber bearing member 154a is positioned therein. The inner surface 51b is the bearing surface on which bearing surface 54a of sleeve 53 rotates. Rubber bearing member 154a has inner grooves 155a (corresponding to grooves 155 in the first embodiment) for conducting drilling mud as a lubricant. The other parts of this embodiment are the same and function the same as the first embodiment.

The operation of this embodiment of the invention is the same as that of the first described embodiment, the only difference being in the location of the rubber bearing members in the turbine stator members.

While this invention has been described fully and completely with special emphasis upon several preferred embodiments, it should be understood that other equivalent means of carrying out the inventive features may be utilized without departing from the scope and intent of coverage of this invention. While this apparatus has been described with a vertical orientation, it is to be understood that it may be and is used in other positions. The term "vertical," therefore, is intended to mean "longitudinal" or "axial" of the turbodrill.

I claim:

1. A turbodrill adapted for connection at one end to the lower end of a drill string and at the other end to a drill bit to be driven thereby, comprising
   a tubular housing having an upper stator portion and a lower bearing portion,
   a stator comprising a plurality of fixed stator members in said stator portion,
   said fixed stator members each comprising an outer and inner sleeve member with a stator blade extending radially therebetween,
   a rotor shaft extending through said stator portion,
   a plurality of rotor members, each comprising a sleeve member supported in a fixed position on said rotor shaft and having a turbine blade extending radially therefrom,
   said turbine blades being cooperable with said stator blades whereby the flow of drilling fluid through said turbodrill housing is operable to rotate said rotor shaft,
   said rotor sleeve members being supported one in each of said stator inner sleeves in rotary bearing relation therewith and forming a rotary bearing for rotation of said rotor shaft and said turbine blades,
   at least one of said sleeve members in each of said rotary bearings having a peripheral recess in the surface thereof and a rubber bearing member supported in each such recess in bearing relation with the other of said sleeve members of such rotary bearing, and
   said rubber bearing members each having passages in the bearing surfaces thereof operable to conduct drilling fluid into the space of rotary bearing contact to cool and lubricate the rotary bearing surfaces.

2. A turbodrill according to claim 1 in which said peripheral recesses are in said rotor sleeve members.

3. A turbodrill according to claim 1 in which said peripheral recesses are in said stator inner sleeve members.

4. A turbodrill according to claim 2 in which said rubber bearing passages comprise flats formed in the surfaces thereof and equally spaced around the periphery of the bearing surfaces thereof.

5. A turbodrill according to claim 3 in which said rubber bearing passages comprise longitudinally extending grooves formed in the surfaces thereof.

6. A turbodrill according to claim 1, 2 or 3 in which said rubber bearing members are of Buna N, having a Durometer hardness of about 90, and are molded on said peripheral rotary bearing sleeve member recesses.

* * * * *